Nov. 4, 1952 P. H. J. BROUWER 2,617,054
MAGNETIC CIRCUIT FOR ROTARY ELECTRIC LOW-POWER APPARATUS
Filed June 19, 1951
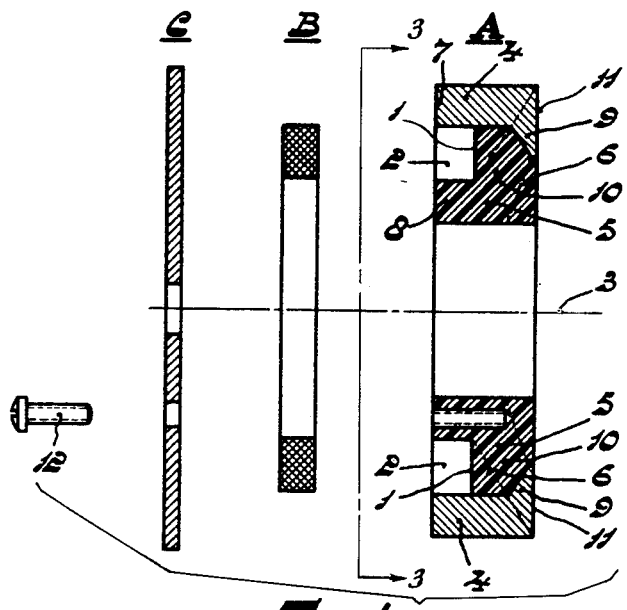
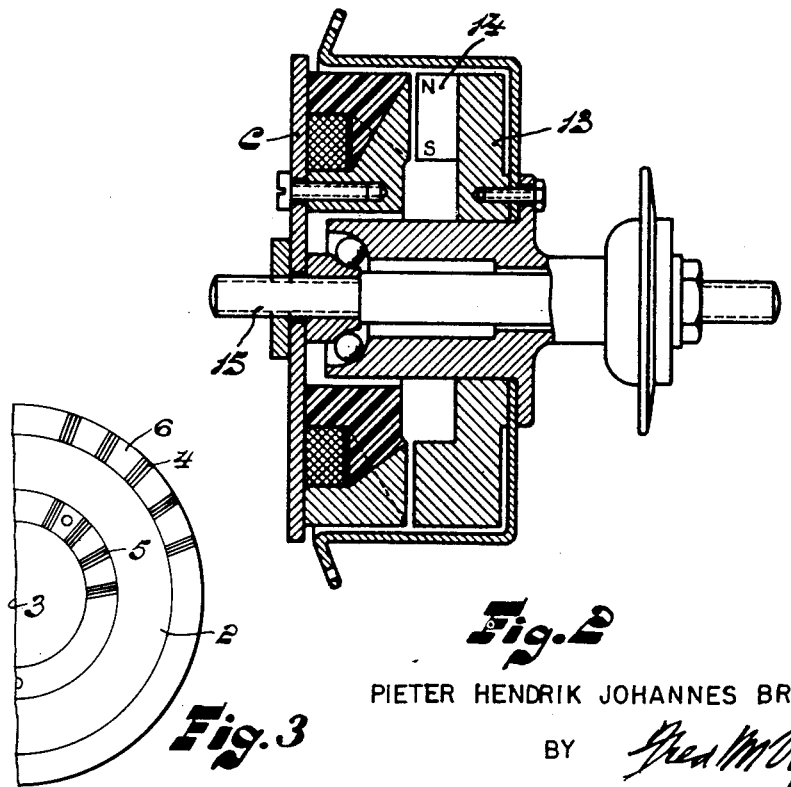
INVENTOR
PIETER HENDRIK JOHANNES BROUWER
BY
AGENT Patented Nov. 4, 1952

2,617,054

UNITED STATES PATENT OFFICE 2,617,054

MAGNETIC CIRCUIT FOR ROTARY ELECTRIC LOW-POWER APPARATUS

Pieter Hendrik Johannes Brouwer, Eindhoven, Netherlands, assignor to Hartford National Bank and Trust Company, Hartford, Conn., as trustee Application June 19, 1951, Serial No. 232,314
In the Netherlands July 10, 1950

3 Claims. (Cl. 310—195)

The invention relates to a magnetic circuit for use in a rotary electric low-power apparatus, the term "low-power" being understood to mean having an output power up to approximately 30 W. The circuit may act, for example, as the stator or the rotor of a small dynamo or motor.

According to the invention, the magnetic circuit comprises a channel-forming annular body, the bottom of which is located in a place at right angles to the axis of the ring, this body being built up from at least substantially radial, solid or laminated sheets of magnetic material, which alternately form part of the one end of a sidewall of the channel and which are connected together by intermediate insulations so as to form a single unit, which by means of the walls of the channel-forming part containing an annular coil, is secured in a magnetically conducting manner to a support of magnetic material, which covers the channel opening.

One of the essential advantages of the circuit according to the invention consists in that the circuit can be built up of only three parts in a simple manner requiring little time. These parts are: the channel-forming annular body, the coil and the support. The assembly involves the introduction of the coil into the channel-forming part of the annular body, and subsequent attachment of the annular body to the support, for example, by means of a few bolts screwed in the walls of the channel. This method of attachment has the advantage that the support can be readily removed, if the coil is required to be replaced by another. If this facility need not be provided for, the support may be secured in a permanent manner, for example, by soldering.

The annular body may also be built up in a simple manner by positioning the plates on a jig and baking them together in this position with the use of insulating material, such as synthetic resin.

The circuit according to the invention may act, for example, as the stator of a hub dynamo, the support constituting the circular plate fastened to the shaft of the wheel and covering, as usual, the open side of the hub.

In one embodiment of the invention the body is built up from substantially L-shaped plates, the corresponding arms of the plates forming part alternately of the one end of a side wall of the channel, whereas other arms, as the poles together with the insulating material form part of the channel bottom.

In order that the invention may be more clearly understood and readily carried into effect, it will now be described in detail with reference to the accompanying drawing, in which Fig. 1 shows sections of parts A, B and C, from which a magnetic circuit according to the invention can be formed.

Fig. 2 shows a hub dynamo, in which the circuit according to the invention acts as the stator.

Fig. 3 is a fragmentary elevational view of element A taken on line 3—3 of Fig. 1.

Referring to Fig. 1 A designates a channel-forming annular body, the bottom 1 of the channel 2 being located in a plane at right angles to the axis of the ring 3. The body A is formed from solid plates 4 and 5 of magnetic material, which are L-shaped and from insulating material 6 between the plates. The insulating material such as synthetic resin and the plates are assembled to form a single unit. The plates are anchored in the insulating material by locally deforming the material of the plates, so that the material is caused to become located outside the plane of the plate. Figure 1 shows two plates 4 in the plane of the section and two plates 5 shown in broken lines. The plates 4, 5 extend radially. However, as an alternative, the plates may extend so as to slightly diverge from the radial direction. One of the arms of the plates 4 forms part of the outer side wall 7 and corresponding arms of the plates 5 form part of the inner side wall 8 of the channel 2. Since each plate 5 is located in a plane intermediate two plates 4, the plates 4, 5 alternately form part of the one (7) and the other (8) sidewall of the channel. Between the plates 4 or 5 the sidewalls of the channel 7 or 8 are formed by insulating material 6. The arms 9 and 10, as poles 11 of opposite polarities, form together with the insulating material 6 part of the bottom of the channel 2. An annular coil B fits in the channel 2 of the annular body A and a plate C of magnetic material can be secured to the annular body A so as to be readily removable by means of bolts 12, of which only one is shown in the drawing, so that the plate C acts as a support which covers the channel opening. The walls 7 and 8 of the channel-forming part thus enable the magnetic circuit to be built up in a simple manner requiring little time from only three parts, namely the channel-forming body A, the coil B and the support C.

In the hub dynamo, shown diagrammatically in Fig. 2, the rotor is constituted by an annular, permanent magnet 13, which is provided with pole places 14, which are magnetized in the axial direction. As may be seen from the figure, the support C shown in Fig. 1 forms the circular plate seated on the shaft 15 of the wheel and covering the open side of the hub.

What I claim is:

1. A magnetic circuit for use in rotary electric low-power apparatus comprising an annular body having an annular channel which has its bottom located in a plane at a right angle to the aixs of the annular body, an annular coil in said channel, an end plate of magnetic material secured to said annular body and covering said channel, said annular body comprising a plurality of substantially radial solid sheets of magnetic material, each having lateral arms at one end thereof which interlock forming poles in a plane at right angles to the axis of said annular body, insulating material intermediate said sheets to connect said sheets together to form a single unit, said insulating material alternately forming the bottom of the channel, and said sheets alternately forming part of the sidewalls of the channel.

2. A magnetic circuit for use in rotary electric low-power apparatus comprising an annular body having an annular channel which has its bottom located in a plane at a right angle to the axis of the annular body, an annular coil in said channel, an end plate of magnetic material secured to said annular body and covering said channel, said annular body comprising a plurality of substantially radial, laminated sheets of magnetic material, each having lateral arms at one end thereof which interlock forming poles in a plane at right angles to the axis of said annular body, insulating material intermediate said sheets to connect said sheets together to form a single unit, said insulating material alternately forming part of the channel, and said sheets alternately forming part of the sidewalls of the channel.

3. A magnetic circuit for use in rotary electric low-power apparatus comprising an annular body having an annular channel which has its bottom located in a plane at a right angle to the axis of the annular body, an annular coil in said channel, an end plate of magnetic material secured to said annular body and covering said channel, said annular body comprising a plurality of substantially L-shaped radial solid plates of magnetic material, each having lateral arms at one end thereof which interlock forming poles in a plane at right angles to the axis of said annular body, insulating material intermediate said plates to connect said sheets together to form a single unit, said insulating material alternately forming part of the bottom of the channel, said plates having some arms which form part of the sidewalls of the channel, and alternately other arms which form, together with said insulating material, part of the bottom of the channel.

PIETER HENDRIK JOHANNES BROUWER.

REFERENCES CITED

The following references are of record in the file of this patent:

UNITED STATES PATENTS

| Number | Name | Date |
|---|---|---|
| 1,287,309 | Hensley | Dec. 10, 1918 |
| 1,326,349 | Kempton | Dec. 30, 1919 |
| 2,423,869 | Blessing | July 15, 1947 |
| 2,465,983 | Winther | Mar. 29, 1949 |
| 2,492,197 | Schellens | Dec. 27, 1949 |

FOREIGN PATENTS

| Number | Country | Date |
|---|---|---|
| 175,995 | Great Britain | Mar. 29, 1923 |